United States Patent [19]
Moffett et al.

[11] Patent Number: 6,134,825
[45] Date of Patent: Oct. 24, 2000

[54] FISHING LURE CONTAINER

[76] Inventors: Loren Paul Moffett, deceased, late of Concordia; by Dora Mae Moffett, legal representative, 1302 Spruce, Concordia; by Paul Michael Moffett, legal representative, 428 E. 14th, Concordia; by David Wayne Moffett, legal representative, 121 E. 2nd St., Concordia, all of Kans. 66901; by Mark Andrew Moffett, legal representative, 105 W. 3rd Ave., Apt. 4, Denver, Colo. 80223

[21] Appl. No.: 09/173,628

[22] Filed: Oct. 16, 1998

[51] Int. Cl.⁷ ................................................. A01K 97/06
[52] U.S. Cl. ..................... 43/57.1; 206/315.11; 211/164
[58] Field of Search ............................. 43/55–57, 54.1, 43/57.1, 57.2; 206/315.11; 211/164, 165

[56] References Cited

U.S. PATENT DOCUMENTS

| | | |
|---|---|---|
| 2,702,442 | 2/1955 | Wallen . |
| 2,814,152 | 11/1957 | Trujillo . |
| 2,927,395 | 3/1960 | Bartlett . |
| 4,563,834 | 1/1986 | Spencer . |
| 5,025,588 | 6/1991 | Echols ........................................ 43/57.1 |
| 5,934,010 | 8/1999 | Blackburn ................................. 43/57.1 |

*Primary Examiner*—Jack W. Lavinder
*Attorney, Agent, or Firm*—Kenneth H. Jack; Davis & Jack, L.L.C.

[57] ABSTRACT

A container for fishing lures, the fishing lures having pointed fishhooks, the container consisting of a styrofoam fishhook point receiving block having an axis of rotation; a cylinder having an outer surface, an interior space, a wall, the wall having a fishing lure insertion and retrieval aperture therethrough, and a pair of ends; a pair of end covering plates fixedly attached to the cylinder, the end covering plates covering the ends of the cylinder; a drive axle rotatably mounting the styrofoam fishhook point receiving block within the interior space of the cylinder, the drive axle positioning such block therein so that its axis of rotation extends through the pair of end covering plates; a slide plate; and a pair of slide channels fixedly attached to the cylinder, the slide channels slidably mounting the slide plate upon the cylinder so that the slide plate may alternately slidably move between a first position wherein the slide plate covers the fishing lure insertion and retrieval aperture, and a second position opening the fishing lure insertion and retrieval aperture.

4 Claims, 5 Drawing Sheets

FISHING LURE CONTAINER

FIELD OF THE INVENTION

This invention relates to containers for fishing apparatus. More particularly this invention relates to containers specially adapted for retaining and displaying fishing lures and jigs.

BACKGROUND OF THE INVENTION

Fishing tackle boxes having stacked partitioned trays for retaining and displaying fishing lures and fishing jigs are known. A drawback or disadvantage of such fishing tackle boxes having lure containing trays is that they inefficiently utilize space. A typical lure tray utilized in such a fishing tackle box is approximately twelve inches wide, five inches deep, has a vertical wall dimension of approximately one inch, and is partitioned into twelve one inch wide lure containing sub-spaces. Commonly, only a single fishing lure may be conveniently stored within one of such sub-spaces. Spaces within each of such subspaces which is not occupied by a fishing lure constitutes wasted space. Another drawback or deficiency of such fishing tackle boxes having stacked lure containing trays commonly arises when their divided sub-spaces are utilized as bins for stacked storage of smaller lures and jigs. By piling smaller lures and jigs, one upon another, within such a sub-space, space economy may be achieved. However, such usage of such sub-spaces prevents lures and jigs from being properly displayed for efficient viewing and selection and allows jigs and lures to become entangled with each other.

The instant inventive fishing lure container solves the above problems by providing a cylindrical canister having a fishing lure or fishing jig retaining carousel rotatably mounted therein. Such canister with carousel therein provides for space economy, allowing lures and jigs to be retained and closely stored next to each other without tangling, and allowing convenient and efficient display of all jigs and lures so stored for convenient selection.

PRIOR ART PATENTS

U.S. Pat. No. 5,606,820 issued Mar. 4, 1997, to Suddeth discloses a tangle-free fishing lure storage container.

U.S. Pat. No. 5,542,206 issued Aug. 6, 1996, to Lisch discloses a fishing lure and fishing tackle stacking container.

U.S. Pat. No. 5,533,297 issued Jul. 9, 1996, to Crosby discloses a cylindrical fishing lure container.

U.S. Pat. No. 5,475,943 issued Dec. 19, 1995, to Hodges discloses fishing tackle boxes with separable leaves for supporting lures.

U.S. Pat. No. 5,289,940 issued Mar. 4, 1994, to Wisenbaugh discloses a rotary fishing lure container.

U.S. Pat. No. 4,999,943 issued Mar. 19, 1991, to Crabtree discloses a seat pedestal fishing lure container having rotatably mounted trays.

U.S. Pat. No. 4,813,173 issued Mar. 21, 1989, to Abbotoy discloses a cylindrical fishing lure container.

U.S. Pat. No. 4,366,641 issued Jan. 4, 1983, to Price, et al., discloses a fishing lure container and transporter.

None of the above disclosed patents teach, disclose or describe the novel, inventive, useful and unique aspects, elements and features of the present inventive fishing lure container.

BRIEF SUMMARY OF THE INVENTION

The instant inventive fishing lure container preferably comprises a circular plastic cylinder having an interior space and opening at either end. The cylinder may suitably have other lateral cross-sectional shapes. The side wall of the cylinder preferably has a rectangular aperture therethrough for insertion and retrieval of fishing lures and jigs. The ends of the cylinder preferably are closed by a pair of circular discs which are closely fitted for fixed mounting within the interior bore of the cylinder.

An arcuately curved slide plate fitted and sized to cover and close the fishing lure insertion and retrieval aperture is preferably slidably mounted upon the outer peripheral surface of the cylinder. Sliding means is preferably provided, allowing the slide plate to alternately slide between a first position covering the aperture, and a second position opening the aperture. Preferably, the slide plate has a pair of substantially parallel side edges, such side edges being slidably positioned within a pair of slide channels positioned at opposing ends of the fishing lure insertion and retrieval aperture. Preferably, the slide plate and slide channels are constructed so that the fishing lure insertion and retrieval aperture may be easily opened and closed through application of manual pressure to ridges extending outwardly from the slide plate.

In order to store and display fishing lures or jigs within the interior space of the cylinder, a fishhook point receiving block or a fishhook engaging rack is rotatably mounted therein in carousel fashion. Preferably, a drive axle fixedly attached to the block or rack, as the case may be, extends through a drive shaft aperture centered within and through one of the circular discs, allowing manual turning of the drive axle. Rotation of the drive axle rotates the block or rack within the cylinder. Preferably, the end of the drive axle extending through the drive shaft aperture has a manually manipulatable "T" handle fixedly attached thereto.

Where a fishhook point receiving block is rotatably mounted within the interior space of the cylinder, it is preferable that the block comprise a material selected from polystyrene foam, foam rubber, or cork. Also preferably, where such a block is utilized, the drive axle extends axially therethrough, the ends of the functioning as journaled ends of the block. Such journaled ends facilitate rotatable mounting of the block within the interior space of the cylinder.

Where a fishhook engaging rack is rotatably mounted within the interior space of the cylinder, it is preferable that the rack comprise a pair of circular discs interconnected by a plurality of longitudinally extending fishhook engaging shafts. Preferably, a plurality of the longitudinally extending fishhook engaging shafts are radially positionable for selective accommodation of differently sized fishing lures.

In operation of the fishing lure container, where the container has rotatably mounted therein a fishhook point receiving block, the slide panel may be slidably opened and fishing jigs may be conveniently stored and displayed upon the several faces of the block by inserting the points of the jigs into the block. Turning the manually, manipulatable "T" handle turns the block within the interior space of the cylinder, exposing various faces of the block and various fishing jigs to view through the fishing lure insertion and retrieval aperture.

Where a rack is alternately rotatably installed within the interior space of the cylinder, the container is utilized in much the same fashion, with the exception that double hook lures are suspended from the longitudinally extending shafts of the rack.

Accordingly, it is an object of the present invention to provide a fishing lure container which achieves space economy in storage of fishing jigs or fishing lures, and which provides a conveniently accessible display of a large number of fishing jigs and fishing lures by providing a fishhook point receiving block or a fishhook engaging rack, the block or rack being rotatably mounted within a cylinder.

Other and further objects, benefits, and advantages of the present invention will become known to those skilled in the art upon review of the Detailed Description which follows, and upon review of the Appended Drawings.

DETAILED DESCRIPTION OF THE PREFERRED EMBODIMENT

Figure 1:
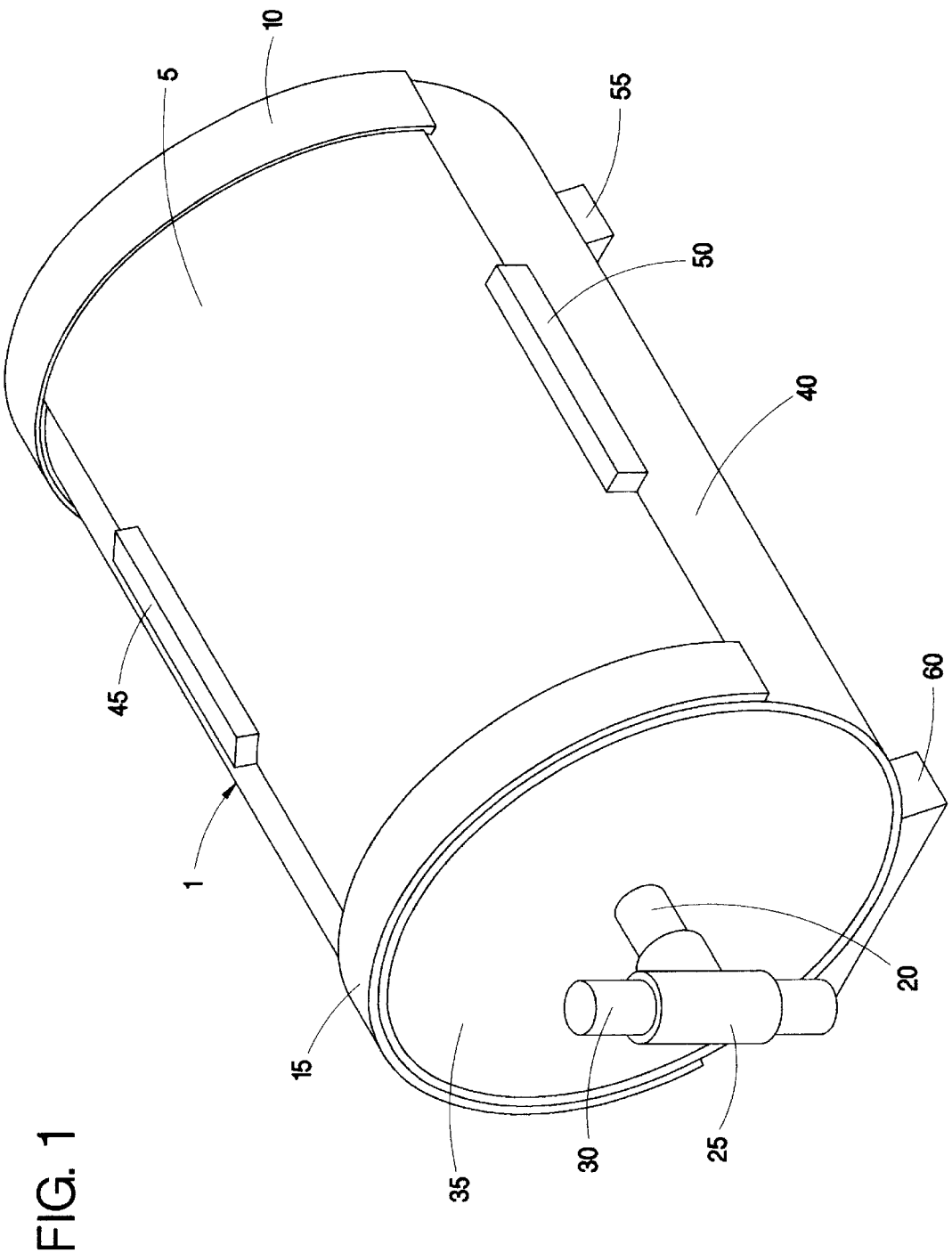
FIG. 1 is an isometric view of the instant inventive fishing lure container.

Referring now to the drawings, and in particular to Drawing FIG. 1, the instant inventive fishing lure container is referred to generally by reference numeral 1.

Figure 5:
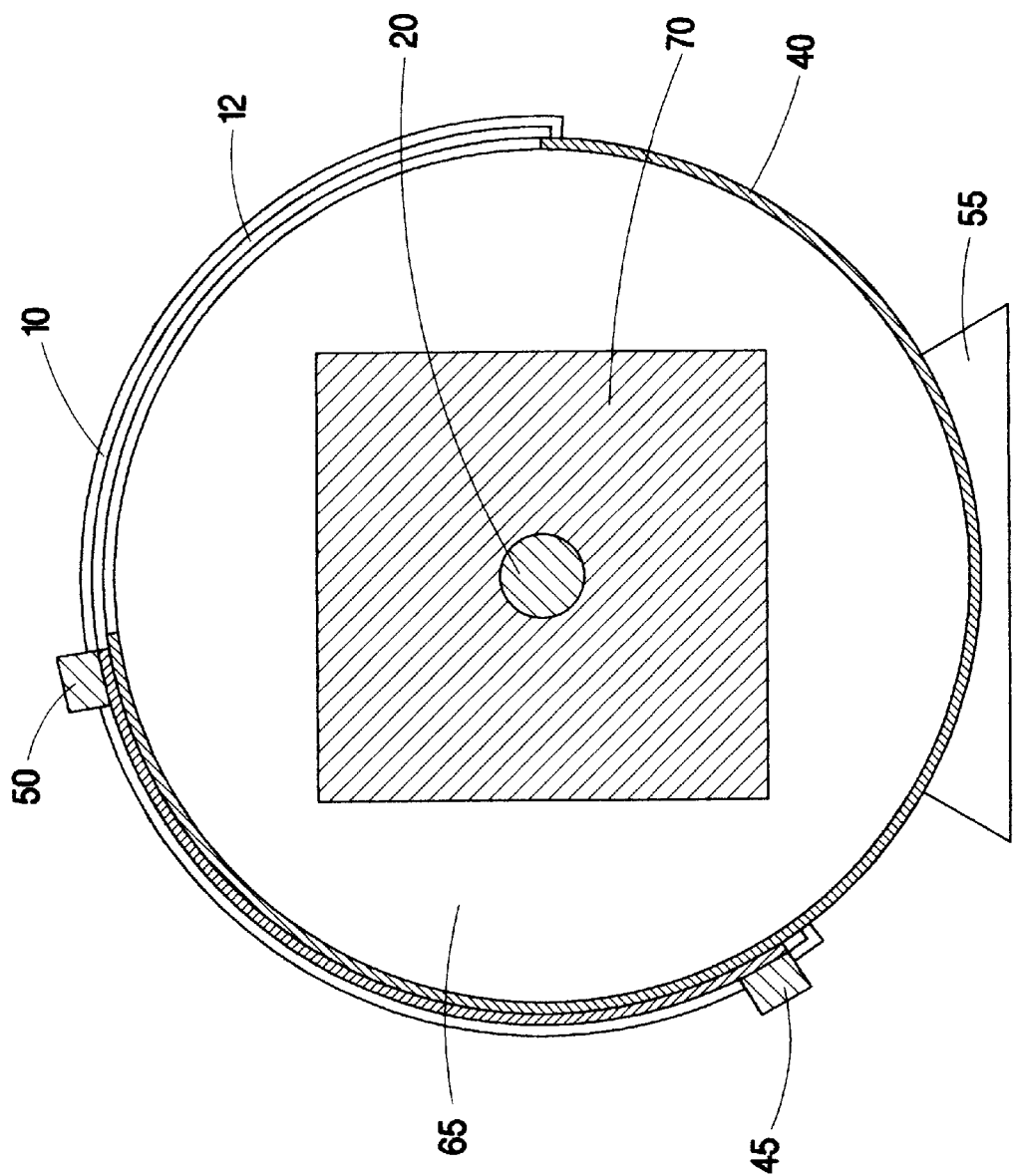
FIG. 5 is a lateral sectional view of FIG. 2.

The major structural element of the fishing lure container 1 is a cylinder 40 having a curved slide plate 5. Referring simultaneously to FIGS. 1 and 5, the slide plate 5 is slidably mounted upon the cylinder 40 by means of a pair of flanges 10 and 15, the flanges 10 and 15 forming and defining a pair of slide channels 12. Through manual application of finger pressure to either of the finger ridges 45 or 50, the slide plate 5 may be slidably moved around the periphery of the cylinder 40, exposing the interior of the cylinder through a fishing lure insertion and removal aperture.

Referring simultaneously to FIGS. 1 and 5, the ends of the cylinder 40 are preferably closed by a pair of circular discs 35 and 65, the circular discs 35 and 65 being closely fitted for mounting within the inner peripheral surfaces of the cylinder 40. Referring to FIG. 1, the fishing lure container preferably has a pair of feet, 55 and 60, allowing the container to be conveniently placed upon a flat surface for use without rolling.

Figure 2:
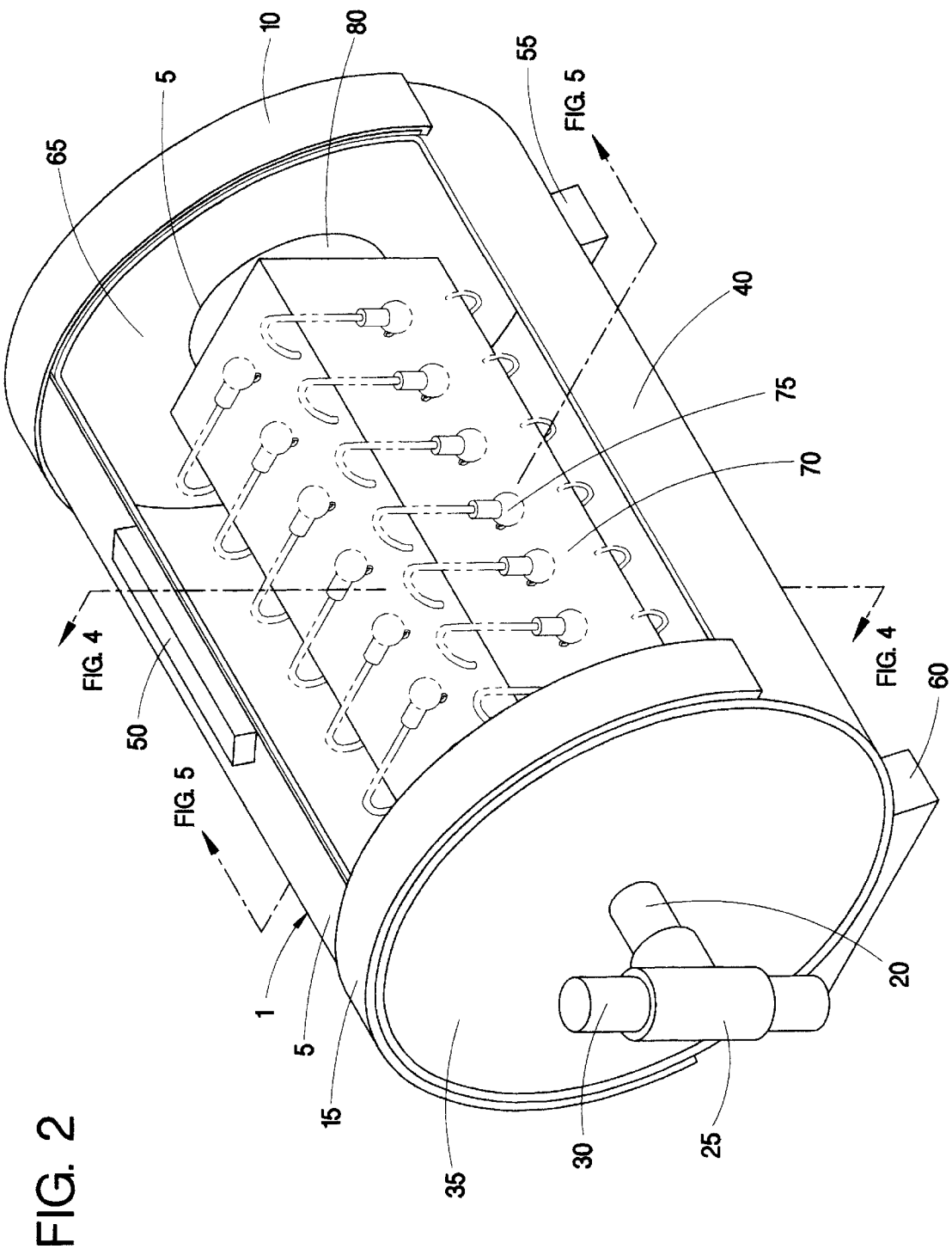
FIG. 2 is an isometric view of the instant inventive fishing lure container, the view showing the container's slide panel door in its opened position.
Figure 4:
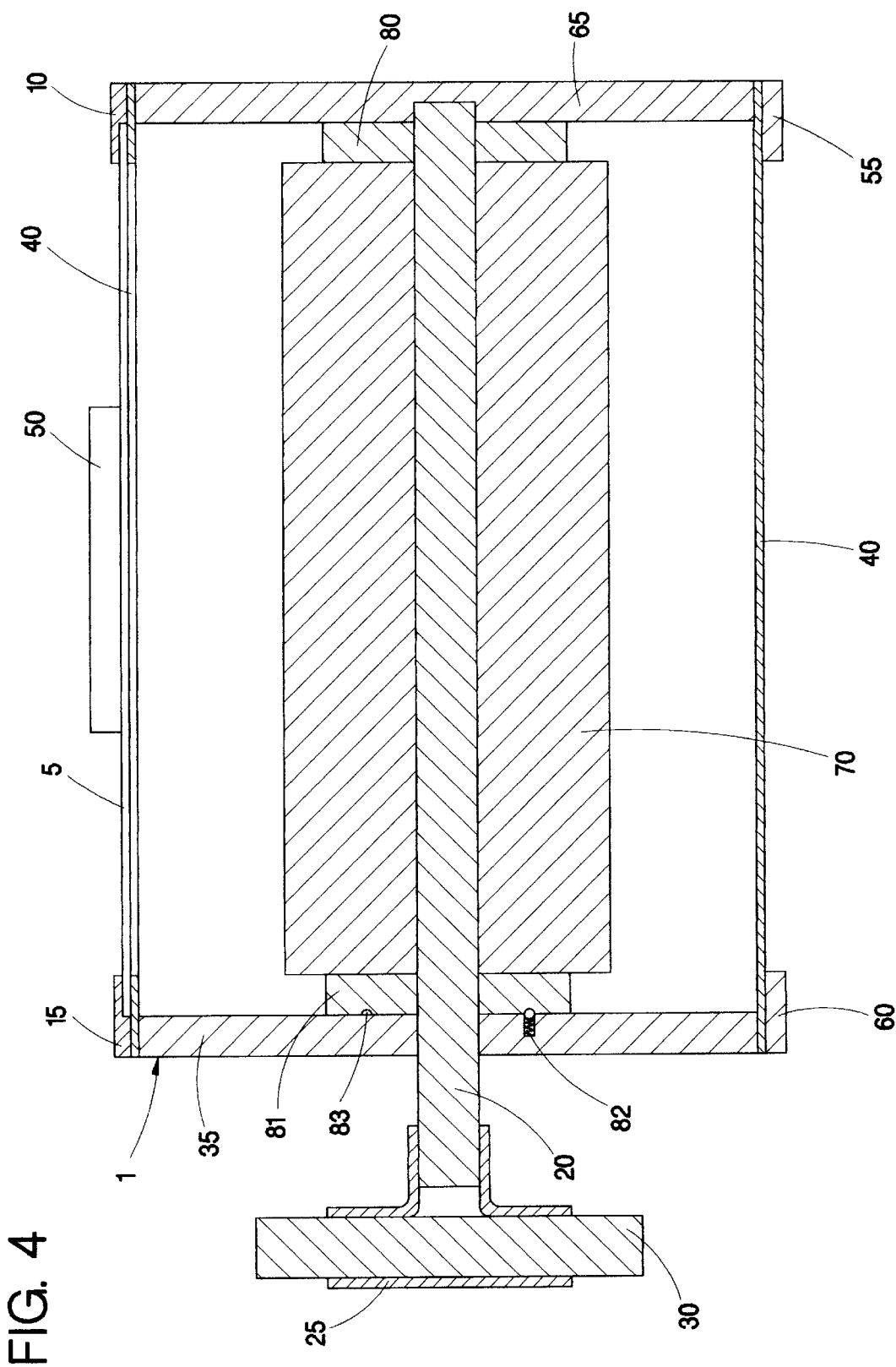
FIG. 4 is a longitudinal sectional view of FIG. 2.

Referring simultaneously to FIGS. 2 and 4, a drive axle 20 preferably extends through a drive axle aperture, such aperture extending through the circular disc 35. Preferably, the opposite end of the drive axle 20 rotatably nests within a circular axle receiving indentation which extends axially into the circular disc 65. A T-channel connector 25 is preferably fixedly mounted upon the end of the drive axle 20 extending through the drive axle receiving aperture of circular disc 35, the T-channel connector 25 having transversely mounted therethrough a T-handle 30. Through manual manipulation and turning of the T-handle 30 and the T-channel connector 25, the drive axle 20 may be caused to rotate about its longitudinal axis of rotation.

Referring simultaneously to FIGS. 2 and 4, an oblongated block 70 and a pair of washers, 80 and 83, are fixedly mounted over the drive axle 20, such elements 70, 80 and 83 fixedly positioning the drive axle 20 longitudinally with respect to the interior space of the container 1, and allowing the oblongated block 70 to rotate within the cylinder 40 as the drive axle 20 turns.

Referring to FIG. 4, the block 70 is preferably oriented by means of a spring biased ball bearing 82 which extends into depressions 83.

Figure 3:
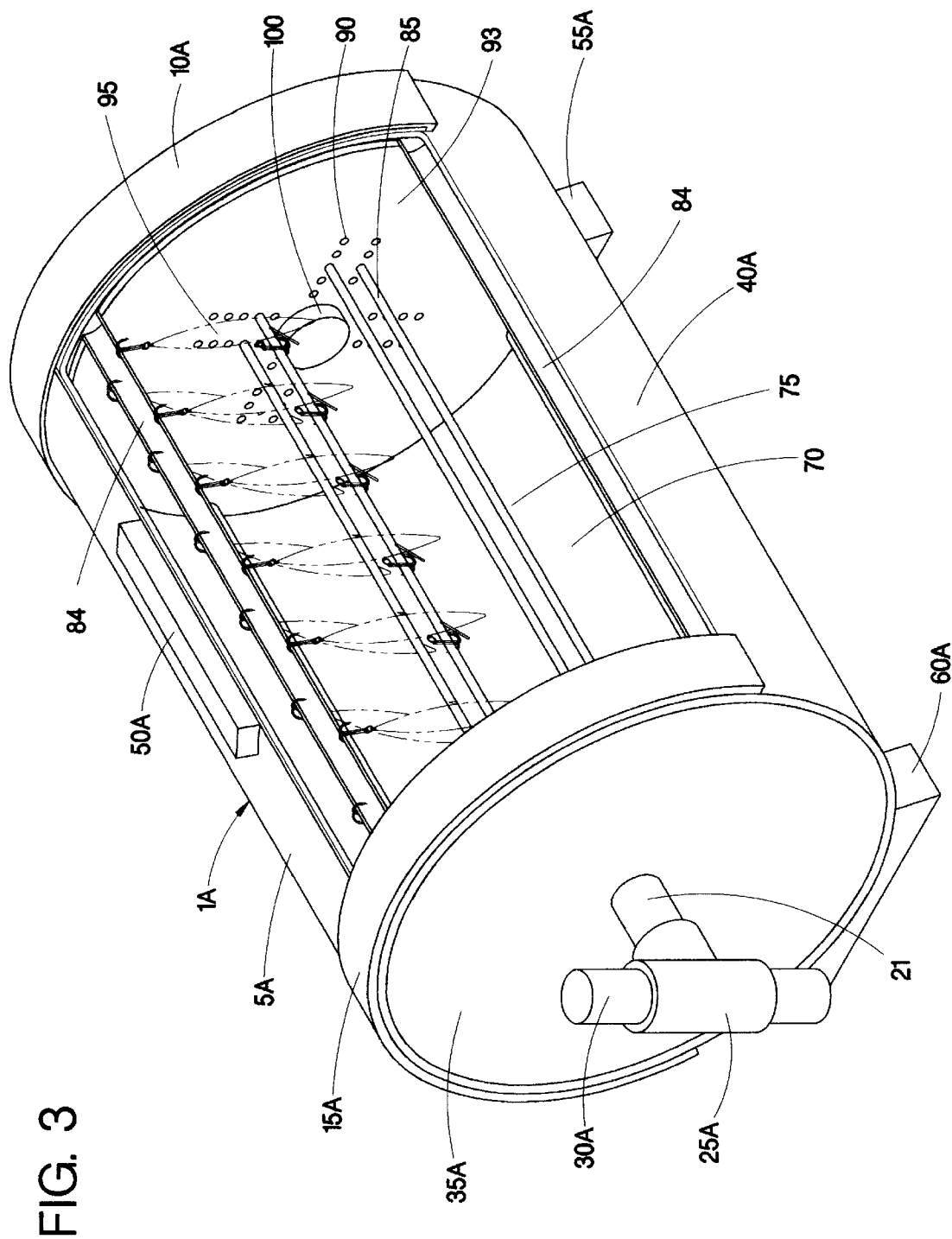
FIG. 3 is an alternate preferred embodiment showing utilization of a rotatable rack in place of the rotatable block depicted in FIG. 2.

Alternately, referring to FIG. 3, all reference numerals bearing the suffix "A" are structurally identical to coincidentally numbered elements shown in FIG. 2. The alternate rotatable rack depicted in FIG. 3 preferably comprises four hook engaging channel shafts 84 and a plurality of adjustably positionable hook engaging shafts 85, the hook engaging channel shafts 84 and the hook engaging shafts 85 extending longitudinally between and interconnecting a pair of rotatably mounted discs 93. As in FIG. 2, the drive axle 21 of FIG. 3 rotates the rotatable rack. Rotatable support of the opposing end of the rack of FIG. 3 is provided by a swivel pin 100. Through selective replacement of the longitudinally extending shafts 85 within shaft receiving apertures 90, such shafts 85 may be variably positioned for secure positioning and storage of differently sized double hook lures 95.

Referring simultaneously to FIGS. 1, 2, and 3, fishing jigs 75 and double hook lures 95 may be conveniently stored and retrieved as depicted through alternate opening and closing of the slide panel 5 and through rotating manipulation of the T-handle 30.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

What is claimed is:

1. A container for fishing lures having pointed fishhooks attached thereto, the container comprising:

(a) fishhook engaging means comprising a fishhook engaging rack; the fishhook engaging means having an axis of rotation extending longitudinally therethrough;

(b) a cylinder having a circular lateral cross-sectional shape and having an outer surface, an interior space, a pair of ends, and a wall, the wall having a fishing lure insertion and retrieval aperture therethrough;

(c) a pair of end covering plates fixedly attached to the cylinder, the end covering plates being positioned so that they cover the ends of the cylinder;

(d) rotatable mounting means fixedly attached to the cylinder, the rotatable mounting means supporting the fishhook engaging means within the interior space of the cylinder, and positioning the fishhook engaging means therein so that its axis of rotation extends through the pair of end covering plates;

(e) a slide plate having a pair of substantially parallel edges; and, (f) slidable mounting means fixedly attached to the cylinder, the slidable mounting means slidably supporting the slide plate so that the slide plate may alternately move between a first position wherein the slide plate covers the fishing lure insertion and retrieval aperture, and a second position opening the fishing lure insertion and retrieval aperture, the slidable mounting means comprising a pair of slide channels, the pair of substantially parallel edges of the slide plate being slidably retained by the pair of slide channels; the rotatable mounting means comprising a drive axle, the drive axle having an axis of rotation, the axis of rotation of the drive axle substantially coinciding with the axis of rotation of the fishhook engaging means; wherein at least one of the end covering plates has an axle receiving aperture therethrough; wherein an end of the drive axle extends through the axle receiving aperture; further comprising turning means comprising a manually manipulatable handle fixedly attached to the end of the drive axle extending through the axle receiving aperture; the fishhook engaging rack comprising a pair of circular rotatable plates, and a plurality of longitudinally extending shafts, the longitudinally extending shafts spanning between and interconnecting the pair of circular rotatable plates.

2. The container of claim 1 further comprising radial spacing means fixedly attached to the rack, the radial spacing means allowing adjustable positioning of a plurality of the longitudinally extending shafts.

3. A container for fishing lures having pointed fishhooks attached thereto, the container comprising:

(a) fishhook engaging means comprising a fishhook engaging rack; the fishhook engaging means having an axis of rotation extending longitudinally therethrough;

(b) a cylinder having a circular lateral cross-sectional shape and having an outer surface, an interior space, a pair of ends, and a wall, the wall having a fishing lure insertion and retrieval aperture therethrough;

(c) a pair of end covering plates fixedly attached to the cylinder, the end covering plates being positioned so that they cover the ends of the cylinder;

(d) rotatable mounting means fixedly attached to the cylinder, the rotatable mounting means supporting the fishhook engaging means within the interior space of the cylinder, and positioning the fishhook engaging means therein so that its axis of rotation extends through the pair of end covering plates;

(e) a slide plate having a pair of substantially parallel edges; and, (f) slidable mounting means fixedly attached to the cylinder, the slidable mounting means slidably supporting the slide plate so that the slide plate may alternately move between a first position wherein the slide plate covers the fishing lure insertion and retrieval aperture, and a second position opening the fishing lure insertion and retrieval aperture, the slidable mounting means comprising a pair of slide channels, the pair of substantially parallel edges of the slide plate being slidably retained by the pair of slide channels; the rotatable mounting means comprising a drive axle, the drive axle having an axis of rotation; the axis of rotation of the drive axle substantially coinciding with the axis of rotation of the fishhook engaging means; wherein at least one of the end covering plates has an axle receiving aperture therethrough; wherein an end of the drive axle extends through the axle receiving aperture; further comprising turning means comprising a manually manipulatable handle fixedly attached to the end of the drive axle extending through the axle receiving aperture; the fishhook engaging rack comprising a pair of rotatable plates, and a plurality of longitudinally extending shafts, the longitudinally extending shafts spanning between and interconnecting the pair of rotatable plates.

4. The container of claim 3 further comprising radial spacing means fixedly attached to the rack, the radial spacing means allowing adjustable positioning of a plurality of the longitudinally extending shafts.

* * * * *